Figure 2:
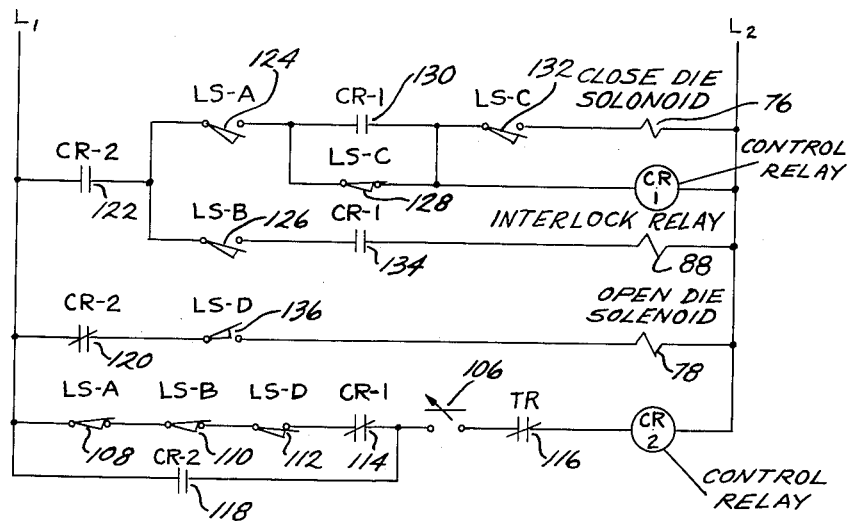

Feb. 13, 1962 B. A. OLMSTED ETAL 3,020,593
ELECTRO-HYDRAULIC SAFETY MECHANISM
Filed Oct. 6, 1959 2 Sheets-Sheet 1

FIG. 1.

INVENTORS
BERNIE A. OLMSTED
FRANCISCO R. CINCO
BY
Teller + McCormick
ATTORNEYS

United States Patent Office 3,020,593
Patented Feb. 13, 1962

3,020,593
ELECTRO-HYDRAULIC SAFETY MECHANISM
Bernie A. Olmsted, East Longmeadow, and Francisco R. Cinco, Springfield, Mass., assignors to Package Machinery Company, East Longmeadow, Mass., a corporation of Massachusetts
Filed Oct. 6, 1959, Ser. No. 844,714
10 Claims. (Cl. 18—30)

This invention relates to safety devices for machines and, more particularly, to an electro-hydraulic safety system and apparatus which can be employed advantageously on plastic injection molding machines, die casting machines, and other machines where a hazard is involved due to closing parts like the relatively movable die members of the specific machines mentioned.

It is the general object of the invention to provide a substantially foolproof safety mechanism for machines of the type mentioned which prevents the machine operator from placing his hands or any part of his body between closing die members or the like and which operates to prevent such closing movement in the machine involved when conditions are such that the operator could place his hands between the closing members and which includes means assuring safe operation even in the event of failure or malfunction of one or more elements of the safety mechanism.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

In the drawing:

FIG. 1 is a schematic illustration of the hydraulically operated mechanical elements of the safety mechanism; and FIG. 2 is a wiring diagram showing the electrical control circuit for the safety mechanism.

While the safety mechanism and system provided in accordance with the present invention may be used to advantage in connection with the operation of several different types of machines, it is believed that the advantages of the safety mechanism and system will be quite apparent in describing the application of the invention to plastic injection molding machines and to die casting machines.

Such machines include a pair of die members respectively mounted on platens and in such machines, one of the platens and die members are moved toward and away from the other platen and die member whereby to close and to open the dies. In most machines of this type the movement is horizontal and the die members meet in a vertical plane, and the machine operator stands in a position to observe the die operation and in some instances to remove the molded or cast product from between the die members as they are opened. Obviously, the hazard of injury to the operator is ever present, this occurring most frequently if the operator places his hand or any part of his body between the relatively movable die members as they are being closed.

Machinery manufacturers have heretofore provided various safety mechanisms and devices for machines of this type. It has become an almost universal practice to provide a safety gate which must be placed in position between the operator and the die area to prevent his access thereto before closing movement of the die members can be started. This safety gate is one of the elements of the system of this invention which will now be described.

No attempt has been made to illustrate a plastic injection molding machine or a die casting machine because the construction and operation of such machines are well known and a description thereof is unnecessary to the understanding of the present invention. However, in FIG. 1 there is a schematic illustration of an hydraulic cylinder 10 which includes a piston 12 adapted for reciprocation therein to close and open the die members of such machine, the movable platen and die member (not shown) being connected with the piston 12 as by a rod 14. Hydraulic fluid under substantial pressure is introduced to the left-hand end of the die actuating cylinder 10 through a conduit 16 to effect closing of the dies while the right-hand end of the cylinder 10 is drained to a reservoir or tank through a conduit 18. When the dies are being opened, the left-hand end of the actuating cylinder 10 is drained through the conduit 16 while hydraulic fluid under pressure is introduced to the right-hand end of the cylinder through the conduit 18.

A safety gate 20 of the type mentioned above is provided to prevent access to the die area during closing movement of the dies, this gate being reciprocable horizontally as indicated by the arrow, the gate being shown in its right-hand or "safety" or closed position. Preferably, the safety gate 20 can be moved between its left-hand or open and right-hand or closed positions manually by the operator. In accordance with the present invention, and for purposes which will hereinafter be described, the safety gate is provided with means 22, 22 for engaging and tripping a pair of double-pole limit switches designated LS–A and LS–B. The said limit switches are engaged and tripped preferably substantially simultaneously by the safety gate 20 as it is moved into its closed position, and the said limit switches are held in tripped condition by the gate in its closed position.

The hydraulic conduits 16 and 18 for the die actuating cylinder 10 extend to a valve indicated generally by the reference numeral 24 and which will hereinafter be referred to as a "slave" valve. In addition to the conduits 16 and 18, there are conduits 26 and 28 connected with the valve 24, the conduit or line 26 extending from a source of pressurized hydraulic fluid and the conduit or line 28 extending to a reservoir or tank. Thus, the conduit 26 may hereinafter be referred to as the pressure line while the conduit 28 may be referred to as the drain line. The valve 24 is a three-position valve which for convenience has been illustrated as having a body or core 30 which is slidable axially to place the valve selectively in each of its three positions.

The first of these positions is a neutral or normal position and it is in this position that the valve has been shown in the drawing. In this neutral or normal position, a pair of passages 32 and 34 in the valve body 30 connect the conduits 16 and 18 with the drain line 28 whereby both sides of the die actuating cylinder 10 are drained, thus equalizing the pressure on both sides of the piston 12 so that no die movement will occur. Also in the said neutral or normal position of the slave valve 24, the pressure line 26 is blocked so that no fluid at actuating pressure can flow through the said valve to the die actuating cylinder 10. Preferably, restrictions 36, 36 are located in the passages 32 and 34 to prevent too rapid draining of the die actuating cylinder 10 and to maintain a pressure balance on both sides of the actuating piston 12 during draining.

The second position for the valve 24 is one which may be referred to as its "die closing" position. To achieve this position, the valve body 30 is shifted to the right from the position shown in FIG. 1 to interconnect the conduit 18 and drain line 28 by a passage 38 and to interconnect the conduit 16 and the pressure line 26 by means of a valve passage 40. Thus, fluid under actuating pressure is introduced to the die actuating cylinder 10 on the left-hand side of the piston 12 while the right-hand side thereof is drained. As previously mentioned, this condition results in die closing movement.

A third position for the valve 24 is the one that may be referred to as its "die opening" position. This position is achieved by moving the valve body 30 to the left from the position shown in FIG. 1. In the die opening position, the conduit 16 is connected to the drain line 28 by a valve passage 42 while the conduit 18 is connected to the pressure line 26 by a valve passage 44. Thus, fluid is introduced at actuating pressure to the die actuating cylinder 10 on the right-hand side of the piston 12 while the left-hand side of the piston is drained. As described hereinbefore, this causes opening movement of the dies.

Preferably, the valve 24 is biased to its neutral position by a pair of springs 46, 46 which have been illustrated as seated within right-hand and left-hand valve actuating cylinders 48 and 49 to engage pistons 50, 50 which are connected with the valve body 30. The left-hand valve actuating cylinder 49 may be referred to as the die closing actuating cylinder for the slave valve 24 because when fluid at actuating pressure is introduced to the cylinder through a conduit 52, the valve body 30 is shifted to the right to its die closing position. As will be described hereinafter, control means is provided to drain the right-hand valve actuating cylinder 48 through a conduit 54 at the same time so as to accommodate movement of the slave valve to its die closing position. When fluid at actuating pressure is introduced to the right-hand valve actuating cylinder 48 through the conduit 54 and the left-hand actuating cylinder 49 is drained to the conduit 52, the sleeve valve 24 is moved to the left from the position shown to its die opening position.

In accordance with the present invention, the means controlling operation of the slave valve 24 includes two pilot valves 56 and 58 which will hereinafter be referred to respectively as a master valve and an interlock valve. As will be observed from the drawing, the master valve 56 is connected with the pressure line 26 and the drain line 28. It is also connected with the conduit 54 which extends to the die opening valve actuating cylinder 48, and it is also connected with a conduit 60 extending to the interlock valve 58. The conduit 60 is selectively connected at the interlock valve 58 with the conduit 52 extending to the die closing valve actuating cylinder 49. Thus, it can be said that the master valve 56 is interposed between the fluid source at actuating pressure and the slave valve 24 to control die opening operation thereof, and it can be said that the master valve 56 and the interlock valve 58 are interposed in series between the source of fluid at actuating pressure and the slave valve 24 to control die closing operation thereof.

Referring in greater detail to the master valve 56, it will be observed that in its preferred form it is a three-position valve. While like the slave valve 24 it can be provided in different forms, it has been illustrated as having an axially movable body or core 62 which is provided with a plurality of passages to effect the desired connection at each of its three positions. The master valve has been shown in its neutral or normal position wherein the pressure line 26 is blocked by the valve body 62 and wherein the conduits 54 and 60 are connected to the drain line 28 by valve passages 64 and 66 respectively. Thus, in the said neutral position of the master valve 56, no fluid at actuating pressure can be directed toward the slave valve 24 to move it from its neutral position and the slave valve actuating cylinders 48 and 49 can be drained through the master valve 56. Thus, the die actuating piston and the dies cannot be moved from the positions they are in when the master valve 56 is placed in its neutral or normal position.

A second position for the master valve 56 may be referred to as its "die closing" position, this being the position when the valve body is moved to the left from the position shown in FIG. 1. In the said die closing position of the master valve, the pressure line 26 is connected to the conduit 60 by a valve passage 68 and the drain line 28 is connected to the conduit 54 by a valve passage 70. Thus, the right-hand or die opening actuating cylinder 48 for the slave valve 24 is drained and if the conduit 60 is connected with the conduit 52 at the interlock valve 58, the left-hand or die closing actuating cylinder 49 for the slave valve 24 will receive fluid at actuating pressure.

The third position for the master valve 56 may be referred to as its "die opening" position wherein it is moved to the right from the position shown in FIG. 1. In this position of the master valve the pressure line 26 is connected with the conduit 54 through a valve passage 72 and the drain line 28 is connected with the conduit 60 through a valve passage 74. Thus, the right-hand actuating cylinder 48 for the slave valve 24 will receive fluid at actuating pressure to move the slave valve to its die opening position while the left-hand actuating cylinder 49 for the slave valve is drained through the conduit 60 provided the interlock valve 58 is positioned to interconnect the conduits 52 and 60. In any event, the left-hand valve actuating cylinder 49 will be drained through the interlock valve 58 as will hereinafter be described.

Preferably, the master valve 56 is operated by a pair of solenoids to be moved to its die closing position and to its die opening position and the valve is spring biased to its neutral or normal position. For purposes of illustration, the solenoid 76 has been shown operatively associated with an extension of the valve body 62 and it is arranged to move the master valve to its die closing position whereby the solenoid 76 may be referred to as the "die closing" solenoid. The second solenoid 78 has been shown as operatively associated with another extension on the valve body 62 to move the said valve body to its die opening position whereby the solenoid 78 may be referred to as a "die opening" solenoid. A pair of springs 80, 80 are respectively associated with the solenoids 76 and 78 and with the said extensions of the valve body to provide the biasing force tending to move the master valve 56 to its neutral position and to hold it in said neutral or normal position.

As previously mentioned, the interlock valve 58 is connected with the conduits 52 and 60 and is selectively positioned to effect interconnection therebetween. In addition to these conduits, the interlock valve 58 is connected with a separate drain line 82 leading to the reservoir. For purposes of illustration, the interlock valve 58 has been shown as a two-position spool valve, the spool 84 being shown in its first or normal position wherein it effects communication between the conduit 52 and the drain line 82. The spool 84 is biased to this position by a spring 86 and in accord with the invention, a solenoid 88 is provided to shift the spool 84 to its second position whereby to effect the selective communication between the conduits 52 and 60 while blocking the drain line 82. It will be obvious from the foregoing description of the interlock valve and from FIG. 1 that the left-hand or die closing actuating cylinder 49 for the slave valve 24 can receive fluid at actuating pressure only when the interlock valve solenoid 88 is energized. Further, the said die closing valve actuating cylinder 49 can receive actuating fluid through the interlock valve 58 only after the master valve 56 has been placed in its die closing position. It will also be obvious that at all other times the interlock valve 58 will be positioned as shown to drain the die closing valve actuating cylinder 49 whereby no die closing pressure can be exerted by the die actuating cylinder 10.

It is important to observe that the valve spool 84 is provided to engage and trip a double-pole limit switch LS-C when the interlock solenoid 88 is energized. The significance and purpose of the limit switch LS-C will be described hereinafter with reference to FIG. 2 showing the electrical control circuit employed with and forming a part of the safety mechanism of this invention.

Before turning to a description of the electrical portion of the safety mechanism, reference is made to means preventing the machine operator from opening the safety gate 20 while the die actuating cylinder 10 has fluid under pressure therein tending to exert closing pressure or force on the dies. This means comprises a safety gate lock cylinder 92 having a piston 94 provided with a rod or extension 96 engaging a pivoted stop lever 98. When fluid under pressure is admitted to the bottom of the cylinder 92, the piston 94 is thrust upwardly to pivot the stop lever 98 upwardly from the position shown to a position wherein it will be disposed in the path of movement of the safety gate 20 to prevent its movement in the opening direction to a position wherein the machine operator would have access to the die area. However, the safety gate 20 can be moved toward the left a sufficient distance to disengage the limit switch trips 22, 22 from the limit switches LS–A and LS–B thereby permitting said double-pole limit switches to assume their normal positions. When there is no fluid under pressure introduced to the bottom of the safety gate lock cylinder 92, a spring 100 forces the piston 94 downwardly therein to permit the stop lever 98 to assume the position shown.

The bottom of the lock cylinder 92 is provided with hydraulic fluid under pressure or it is drained by means of a conduit 102 extending thereto from the conduit 16. In addition, a conduit 104 extends to the top of the lock cylinder 92 from the conduit 18. Thus, when the die actuating cylinder 10 receives fluid under pressure through the conduit 16 to close the dies, the lock cylinder 92 is operated to place the stop lever 98 in its upper or stop position, the conduits 18, 104, and the top of the lock cylinder 92 being drained at this time. When the die actuating cylinder 10 receives fluid under pressure to open the dies as previously described, fluid under pressure is admitted to the top of the lock cylinder 92 to thrust the piston 94 downwardly and to move the stop lever 98 to its inactive position, the conduits 16, 102, and the bottom of the lock cylinder 92 being drained at this time.

Referring now to FIG. 2 showing the electrical portion of the system, it will be observed that the electrical components are connected in circuits to power lines L–1 and L–2 connectible with a conventional source of electrical energy. These various elements and their function can best be described in connection with an explanation of the operation of the machine and the safety mechanism.

Assuming that the dies of the machine are fully open and that the safety gate is withdrawn from its safety position and that the machine operator wants to start the machine upon one cycle of automatic operation, the first operative step performed is to close a selector or start switch 106. This causes a control relay CR–2 to be energized in a circuit between the power lines L–1 and L–2 which includes a normally closed switch half or pole 108 of the limit switch LS–A, a normally closed switch half or pole 110 of limit switch LS–B, a normally open but held closed switch half or pole 112 of a limit switch LS–D, normally closed contacts 114 of a control relay CR–1, and the normally closed contacts 116 of a timer relay TR. The limit switch LS–D is a double-pole limit switch which is tripped by the die mechanism when the dies are fully opened. For purposes of illustration, the limit switch LS–D has been shown in FIG. 1 as tripped by the die actuating piston in the position shown. The timer relay which includes the normally closed contacts 116 need not be shown for purposes of this invention, but it should be understood that this relay is energized by limit switch means when the dies are closed whereby the contacts 116 are opened at the end of the time period for which the relay is set. Then when the dies are opened, the contacts 116 re-close.

Upon energization of the relay CR–2, normally open contacts 118 thereof are closed to provide an interlock maintaining the control relay CR–2 in energized condition, the interlock contacts 118 providing a shunt around the switch contacts or poles 108, 110, 112 and 114.

Also, upon energization of the control relay CR–2, normally closed contacts 120 thereof are opened in a circuit including the open die solenoid 78, and normally open contacts 122 thereof are closed in parallel circuits which respectively include the close die solenoid 76 and the interlock solenoid 88. Up to this point in the operation of the system, there can be no closing movement of the dies because the respective parallel circuits including the close die solenoid 76 and the interlock solenoid 88 respectively include the normally open poles or contacts 124 and 126 of the safety gate actuated limit switches LS–A and LS–B.

Therefore, before any die closing movement can occur, the safety gate 20 must be closed to trip the limit switches LS–A and LS–B. When this is done, the normally open contacts 124 and 126 of the limit switches LS–A and LS–B, respectively, are closed. Upon closing of the contacts 124 a branch circuit extending from the circuit including the close die solenoid 76 is completed to a control relay CR–1 through the normally closed pole or contacts 128 of the limit switch LS–C. Upon energization of the control relay CR–1, normally open contacts 130 thereof are closed in the circuit to the close die solenoid 76. The now closed contacts 130 provide an interlock for the control relay CR–1 to maintain it energized, the contacts 130 being arranged to shunt the normally closed contacts 128 of the limit switch LS–C. However, the close die solenoid 76 will still not be energized unless normally open contacts 132 in its circuit are closed. The normally open contacts 132 are provided by a pole of the limit switch LS–C which can only be tripped when the interlock solenoid 88 is energized.

The interlock solenoid 88 is energized only when the normally open pole 126 of the limit switch LS–B is closed and when normally open contacts 134 of relay CR–1 are closed.

Therefore, in order to effect closing movement of the dies, the operator must close the selector switch 106 to energize the relay CR–2 and he must also close the safety gate 20 to trip the limit switches LS–A and LS–B. In so doing, the control relay CR–1 is energized to complete the circuit to the interlock solenoid 88 which operates to trip the solenoid LS–C and thereby to complete the circuit to the close die solenoid 76. Obviously, the relay CR–2, the limit switches LS–A and LS–B, the relay CR–1, and the interlock solenoid 88 must all function properly before the close die solenoid 76 can be energized, and the timer relay contacts 116 must be closed and the normally open pole 112 must be held closed in the limit switch LS–D due to the dies being open as conditions precedent to die closing operation of the machine.

When die closing movement takes place, the limit switch LS–D is disengaged permitting its normally open pole 112 to open and also permitting its normally closed pole 136 to close. Despite opening of the pole 112, the control relay CR–2 remains energized because of the closed interlock contacts 118. Despite closing of the limit switch pole 136, the open die solenoid 78 is not energized because the normally closed relay contacts 120 remain open.

When the dies of the machine engage and close, switch means (not shown) are closed to energize the timer relay TR which then starts its timing period as set by the operator to provide sufficient time for the molding or casting operation. At the end of the timed cycle, the timer relay operates to open the normally closed contacts 116, at least momentarily, which thereby causes the control relay CR–2 to be de-energized. When the control relay CR–2 is de-energized, its normally open contacts 122 open to de-energize the close die solenoid, the control relay CR-1 and the interlock solenoid 88. Also, the normally closed contacts 120 of the control relay CR-2 close to complete the circuit to the open die solenoid 78 which causes opening movement of the machine dies. The dies will continue to open until the die open limit switch LS-D is tripped, thereby opening the pole 136 in the circuit to the open die solenoid 78 and thereby closing the pole 112 in the circuit to the control relay CR-2.

However, the control relay CR-2 cannot again be energized to start another cycle of die closing operation because the poles 108 and 110 of the safety gate limit switches LS-A and LS-B will remain open while the safety gate 20 is closed. In order to start the machine upon a second cycle, it is necessary to at first open the safety gate 20 to condition the control relay circuit for energization of the relay CR-2 and to again close the safety gate 20 so as to close the limit switch poles 124 and 126 in the close die solenoid and interlock solenoid circuits.

An important observation to be made with respect to the safety mechanism and system of this invention is that the slave valve 24 cannot be shifted to its die closing position to effect closing movement of the machine dies unless or until the master valve 56 and the interlock valve 58 are placed in their die closing positions responsive to energization of the die closing solenoid 76 and the interlock solenoid 88. In the event that either the master valve 56 or the interlock valve 58 sticks in its die closing position through malfunction, the return of the other of the said two valves to its normal position is all that is needed to drain the die closing slave valve actuating cylinder 49, thereby permitting the slave valve 24 to return to its normal position thus preventing the application of closing force on the dies.

In addition, the electrical portion of the system provides self-monitoring features which provide for safety in the event of malfunction or failure of the elements included in the electrical system. For example, if the limit switch LS-A does not trip when the safety gate 20 is closed, the dies cannot be closed since the relay CR-1, the close die solenoid 76 and the interlock solenoid 88 cannot be energized. If the limit switch LS-B is not tripped when the safety gate 20 is closed, the dies will not close because the interlock solenoid 88 cannot be energized. Further, if the limit switch LS-A or the limit switch LS-B fails to return to normal position after the safety gate 20 has been opened, the dies cannot be closed because the control relay CR-2 cannot be energized and the relay CR-1, the close die solenoid 76, and the interlock solenoid 88 cannot be energized. Additionally, if upon energizing the interlock solenoid 88, the limit switch LS-C is not tripped, the dies cannot be closed because the close die solenoid 76 cannot be energized. Still further, if the limit switch LS-C fails to return to its normal position, the dies cannot be closed because the control relay CR-1 cannot be energized and the close die solenoid 76 and the interlock 88 cannot be energized. Moreover, if the control relay CR-1 fails or for any reason remains in an energized condition, the dies can still not be closed because the control relay CR-2 cannot be energized, the close die solenoid 78 cannot be energized, and the interlock relay 88 cannot be energized.

Thus, before any first cycle of automatic operation or any subsequent cycle of operation can be accomplished, it is necessary to close the safety gate in the first instance to open and again close the safety gate in the second and any subsequent instances. It is also necessary that all of the electrical control elements such as the relays and the limit switches be operating properly before the dies can be started on closing movement.

In the event that it is desired to operate the machine automatically on repetitive cycles and to avoid the need for the operator to open the safety gate 20 and then reclose the same at the end of each cycle, a slight modification in the wiring diagram of FIGURE 2 is necessary. That is, a shunt is placed across the poles or contacts 108 and 110 of the limit switches LS-A and LS-B, respectively. When this is done, the selector switch 106 is deleted from the circuit to the control relay CR-2 or it is held closed during all operation, and a selector switch is preferably placed in the shunt line around the poles or contacts 108 and 110.

The invention claimed is:

1. A safety mechanism for a machine having relatively movable dies or the like and a fluid operated actuator for closing and opening the dies and also having a safety gate movable to a closed position to prevent operator access to the dies, the said mechanism having a drain line and a pressure line which is connectible with a source of fluid under pressure and comprising further a fluid operated stop means operatively associated with the actuator and movable to a stop position to prevent opening of the safety gate only when the actuator is operated to effect die closing movement, two control valves for controlling the actuator including a master valve and an interlock valve, the master valve being movable between die closing and die opening positions and being connected with the drain and pressure lines and with the actuator and the interlock valve so that when it is in its die opening position it causes die opening movement of the actuator independently of the interlock valve, and the interlock valve being movable to a die closing position and being connected with the actuator and the pressure line only in series with the master valve whereby die closing movement of the actuator is caused only when the master valve and the interlock valve are in their die closing positions.

2. A safety mechanism for a machine having relatively movable dies or the like and a fluid operated actuator for closing and opening the dies and also having a safety gate movable to a closed position to prevent operator access to the dies, the said mechanism having a drain line and a pressure line which is connectible with a source of fluid under pressure and comprising further a fluid operated slave valve connected between the actuator and the drain and pressure lines and being movable to respectively effect closing and opening movement of the dies, a fluid operated stop means connected with the slave valve and movable to a stop position to prevent opening of the safety gate only when the actuator is operated to effect die closing movement, two pilot valves for controlling operation of the slave valve including a master valve and an interlock valve, the master valve being movable between die closing and die opening positions and being connected with the drain and pressure lines and with the other two valves so that when it is in its die opening position it controls movement of the slave valve to effect die opening movement independently of the interlock valve, and the interlock valve being movable to a die closing position and being connected with the slave valve and the pressure line only in series with the master valve whereby the slave valve can be positioned to effect die closing movement only when the master valve and the interlock valve are in their die closing positions.

3. A safety mechanism for a machine having relatively movable dies or the like and an hydraulic actuator for closing and opening the dies and also having a safety gate movable to a closed position to prevent operator access to the dies, the said mechanism including a drain line and a pressure line which is connectible with a pressurized source of hydraulic fluid and comprising further an hydraulically operated slave valve connected between the actuator and the drain and pressure lines and being movable to respectively effect closing and opening movement of the dies, a fluid operated stop means connected with the slave valve and movable to a stop position to prevent opening of the safety gate only when the actuator is operated to effect die closing movement, two pilot valves for controlling operation of the slave valve including a master valve and a two-position interlock valve, the master valve being movable between die closing and die opening positions and being connected with the drain and pressure lines and with the other two valves so that when it is in its die opening position it controls movement of the slave valve to effect die opening movement in either position of the interlock valve, and the interlock valve being constructed and arranged and connected with the other two valves to permit positioning of the slave valve to effect die opening movement when it is in either of its two positions and to control the slave valve to effect die closing movement only when it is in one of its positions and the master valve is in its die closing position.

4. An electro-hydraulic safety mechanism for a machine having relatively movable dies or the like, an hydraulic actuator for opening and closing the dies, and a safety gate movable to a closed position to prevent operator access to the dies, the said mechanism including a pressure line which is connectible with a source of pressurized hydraulic fluid and also including two control valves comprising a master valve and an interlock valve which are operatively associated with the actuator, the master valve having die opening and die closing positions and being solenoid operated to assume its die closing position, and the master valve being arranged to provide connection between the pressure line and the actuator when in its die opening position to cause die opening operation, the interlock valve being solenoid operated to move to a die closing position wherein it effects a series connection with the master valve in die closing position between the pressure line and the actuator to cause die closing operation, electrical control means for said valves comprising a pair of power circuits respectively including the valve solenoids, and a pair of limit switches having normally open poles respectively located in said circuits, the said limit switches being arranged to be tripped by movement of the safety gate to its closed position.

5. An electro-hydraulic safety mechanism for a machine having relatively movable dies or the like, an hydraulic actuator for opening and closing the dies, and a safety gate movable to a closed position to prevent operator access to the dies, the said mechanism including a pressure line which is connectible with a source of pressurized hydraulic fluid and also including two control valves comprising a master valve and an interlock valve which are operatively associated with the actuator, the master valve having die opening and die closing positions and being solenoid operated to assume its die closing position, and the master valve being arranged to provide connection between the pressure line and the actuator when in its die opening position to cause die opening operation, the interlock valve being solenoid operated to move to a die closing position wherein it effects a series connection with the master valve in die closing position between the pressure line and the actuator to cause die closing operation, electrical control means for said valves comprising a pair of power circuits respectively including the valve solenoids, a pair of limit switches having normally open poles respectively located in said circuits and arranged to be closed by movement of the safety gate to its closed position, the pole in the circuit of the interlock valve solenoid completing that circuit, and a third limit switch having a normally open pole in the circuit of the master valve solenoid and arranged to be closed by movement of the interlock valve to its die closing position whereby to complete the circuit of the master valve solenoid.

6. An electro-hydraulic safety mechanism for a machine having relatively movable dies or the like, an hydraulic actuator for opening and closing the dies, and a safety gate movable to a closed position to prevent operator access to the dies, the said mechanism including a pressure line which is connectible with a source of pressurized hydraulic fluid and also including two control valves comprising a master valve and an interlock valve which are operatively associated with the actuator, the master valve having die opening and die closing positions and being solenoid operated to assume its die closing position, and the master valve being arranged to provide connection between the pressure line and the actuator when in its die opening position to cause die opening operation, the interlock valve being solenoid operated to move to a die closing position wherein it effects a series connection with the master valve in die closing position between the pressure line and the actuator to cause die closing operation, electrical control means for said valves comprising a pair of power circuits respectively including the valve solenoids, a third circuit including a relay and a start switch which relay includes normally open contacts in each of the pair of circuits and which is energized upon closing the start switch, and a pair of limit switches having normally open poles respectively located in said pair of circuits and arranged to be closed by movement of the safety gate to its closed position.

7. An electro-hydraulic safety mechanism for a machine having relatively movable dies or the like, an hydraulic actuator for opening and closing the dies, and a safety gate movable to a closed position to prevent operator access to the dies, the said mechanism including a pressure line which is connectible with a source of pressurized hydraulic fluid and also including two control valves comprising a master valve and an interlock valve which are operatively associated with the actuator, the master valve having die opening and die closing positions and being solenoid operated to assume its die closing position, and the master valve being arranged to provide connection between the pressure line and the actuator when in its die opening position to cause die opening operation, the interlock valve being solenoid operated to move to a die closing position wherein it effects a series connection with the master valve in die closing position between the pressure line and the actuator to cause die closing operation, electrical control means for said valves comprising a pair of power circuits respectively including the valve solenoids, a third circuit including a relay and a start switch which relay includes normally open contacts in each of the pair of circuits and which is energized upon closing the start switch, a pair of limit switches having normally open poles respectively located in said pair of circuits and arranged to be closed by movement of the safety gate to its closed position, the pole in the circuit of the interlock valve solenoid completing that circuit, and a third limit switch having a normally open pole in the circuit of the master valve solenoid and arranged to be closed by movement of the interlock valve to its die closing position whereby to complete the circuit of the master valve solenoid.

8. An electro-hydraulic safety mechanism for a machine having relatively movable dies or the like, an hydraulic actuator for opening and closing the dies, and a safety gate movable to a closed position to prevent operator access to the dies, the said mechanism including a pressure line which is connectible with a source of pressurized hydraulic fluid and also including two control valves comprising a master valve and an interlock valve which are operatively associated with the actuator, the master valve having die opening and die closing positions, and being solenoid operated to assume its die closing position, and the master valve being arranged to provide connection between the pressure line and the actuator when in its die opening position to cause die opening operation, the interlock valve being solenoid operated to move to a die closing position wherein it effects a series connection with the master valve in die closing position between the pressure line and the actuator to cause die closing operation, electrical control means for said valves comprising a pair of power circuits respectively including the valve solenoids, a third circuit including a relay having normally open contacts in each of the pair of circuits, normally closed contacts in said third circuit adapted to be opened with the dies closed and thereafter re-closed, a limit switch having a normally open pole in one of said pair of circuits and a normally closed pole in said third circuit and which is arranged to be tripped by movement of the safety gate to its closed position, and said relay having normally open contacts arranged to shunt said normally closed pole whereby said safety gate must be moved from closed position and then re-closed between cycles of die closing operation.

9. An electro-hydraulic safety mechanism for a machine having relatively movable dies or the like, an hydraulic actuator for opening and closing the dies, and a safety gate movable to a closed position to prevent operator access to the dies, the said mechanism including a pressure line which is connectible with a source of pressurized hydraulic fluid and also including two control valves comprising a master valve and an interlock valve which are operatively associated with the actuator, the master valve having die opening and die closing positions and being solenoid operated to assume its dies closing position, and the master valve being arranged to provide connection between the pressure line and the actuator when in its die opening position to cause die opening operation, the interlock valve being solenoid operated to move to a die closing position wherein it effects a series connection with the master valve in die closing position between the pressure line and the actuator to cause die closing operation, electrical control means for said valves comprising a pair of power circuits respectively including the valve solenoids, a third circuit including a relay having normally open contacts in each of the pair of circuits, normally closed contacts in said third circuit adapted to be opened with the dies closed and thereafter re-closed, a pair of limit switches having normally open poles respectively located in said pair of circuits and respectively having normally closed poles which are connected in series in said third circuit, the said pair of limit switches being arranged to be tripped by movement of the safety gate to its closed position, and said relay having normally open contacts arranged to shunt said normally closed poles whereby said safety gate must be moved from closed position and then reclosed between cycles of die closing operation.

10. An electro-hydraulic safety mechanism for a machine having relatively movable dies or the like, an hydraulic actuator for opening and closing the dies, and a safety gate movable to a closed position to prevent operator access to the dies, the said mechanism including a pressure line which is connectible with a source of pressurized hydraulic fluid and also including two control valves comprising a master valve and an interlock valve which are operatively associated with the actuator, the master valve having die opening and die closing positions and being solenoid operated to assume its die closing position, and the master valve being arranged to provide connection between the pressure line and the actuator when in its die opening position to cause die opening operation, the interlock valve being solenoid operated to move to a die closing position wherein it effects a series connection with the master valve in die closing position between the pressure line and the actuator to cause die closing operation, electrical control means for said valves comprising a pair of power circuits respectively including the valve solenoids, a third circuit including a relay having normally open contacts in each of the pair of circuits, normally closed contacts in said third circuit adapted to be opened with the dies closed and thereafter re-closed, a pair of limit switches having normally open poles respectively located in said pair of circuits and having normally closed poles connected in series in said third circuit, the said pair of limit switches being arranged to be tripped by movement of the safety gate to its closed position, said relay having normally open contacts arranged to shunt said normally closed poles whereby to require said safety gate to be moved from closed position and then reclosed between cycles of die closing operation, and a third limit switch having a normally open pole in the circuit of the master valve solenoid and arranged to be tripped by movement of the interlock valve to its die closing position whereby to complete the circuit of the master valve solenoid.

References Cited in the file of this patent
UNITED STATES PATENTS

| | | |
|---|---|---|
| 2,201,244 | Root | May 21, 1940 |
| 2,318,031 | Tucker | May 4, 1943 |
| 2,334,372 | Abbott | Nov. 16, 1943 |
| 2,415,462 | Cherry et al. | Feb. 11, 1947 |
| 2,465,889 | Lester | Mar. 29, 1949 |
| 2,507,868 | Purcell | May 16, 1950 |
| 2,649,841 | Jacques | Aug. 25, 1953 |

FOREIGN PATENTS

| | | |
|---|---|---|
| 88,022 | Netherlands | May 16, 1958 |